United States Patent [19]

Zandveld et al.

[11] Patent Number: 4,695,944
[45] Date of Patent: Sep. 22, 1987

[54] COMPUTER SYSTEM COMPRISING A DATA, ADDRESS AND CONTROL SIGNAL BUS WHICH COMPRISES A LEFT BUS AND A RIGHT BUS

[75] Inventors: Frederik Zandveld; Jeroen M. Visser, both of Beekbergen, Netherlands

[73] Assignee: U.S. Philips Corporation, New York, N.Y.

[21] Appl. No.: 910,796

[22] Filed: Sep. 22, 1986

Related U.S. Application Data

[63] Continuation of Ser. No. 495,379, May 17, 1983, abandoned.

[30] Foreign Application Priority Data

May 19, 1982 [NL] Netherlands .................. 8202060

[51] Int. Cl.[4] ................. G06F 13/14; G06F 13/38
[52] U.S. Cl. ................................... 364/200
[58] Field of Search ... 364/200 MS File, 900 MS File

[56] References Cited

U.S. PATENT DOCUMENTS

| | | | |
|---|---|---|---|
| 4,047,162 | 9/1977 | Dorey et al. | 364/900 |
| 4,106,104 | 8/1978 | Nitta et al. | 364/900 |
| 4,231,086 | 10/1980 | Tarbox et al. | 364/200 |
| 4,257,099 | 3/1981 | Appelt | 364/200 |
| 4,320,451 | 3/1982 | Bachman et al. | 364/200 |
| 4,380,798 | 4/1983 | Shannon et al. | 364/200 |
| 4,390,943 | 6/1983 | Twibell et al. | 364/200 |
| 4,442,504 | 4/1984 | Dummermuth et al. | 364/900 |

OTHER PUBLICATIONS

Madnick, "Operation System", pp. 255-261, 1974, McGraw-Hill.

*Primary Examiner*—David Y. Eng
*Attorney, Agent, or Firm*—Jack E. Haken; James J. Cannon, Jr.

[57] ABSTRACT

A computer system comprises a bus for data, address and control signals which is divided into a left bus and a right bus by a first gating device. The gating device has an open state which is character-wise activated by a right bus request transported on the left bus. Furthermore, the gating device conducts start signals from a processor station connected to the left bus and interrupt signals from a peripheral apparatus connected to the right bus. In the closed state of the gating device, bulk data transport is possible on the right bus without interfering with the processor station. The processing speed is thus increased.

7 Claims, 7 Drawing Figures

COMPUTER SYSTEM COMPRISING A DATA, ADDRESS AND CONTROL SIGNAL BUS WHICH COMPRISES A LEFT BUS AND A RIGHT BUS

This is a continuation of application Ser. No. 495,379, filed May 17, 1983, now abandoned.

BACKGROUND OF THE INVENTION

1. Field of the Invention

The invention relates to a computer system which comprises a primary processor station and a first random access read-write memory having a first address space interconnected by a primary bus for data, address and control signals; which furthermore comprises a second random access read-write memory having a second address space outside of said first address space, and at least one first peripheral apparatus interconnected by a secondary bus for data, address and control signals; which furthermore comprsies a coupler having a first and a second interfacing circuit for interfacing to said secondary bus, said coupler having a closed state for allowing coexistent primary bus requests on the primary bus and data transfer between respective stations connected to the secondary bus, said coupler having an open state for exchange of data characteris, addresses, data request signals and data acknowledge signals between said primary bus and said secondary bus.

2. Description of the Prior Art

A computer system of this kind is known from U.S. Pat. No. 4,257,099 to D.R. Appelt. The known system deal with a communication bus coupler for a so-called polysystem. Each element of a polysystem is comprised of a multiprocessor system with a plurality of master stations and a plurality of slave stations. Therefore, the level of cooperation in the couplers of the known system is high and the complexity thereof is great. The known system offers a solution when the system is bus through put limited and allows selective communication among various stations across the couplers or within the local system. The present invention is directed to the problem that occurs when the capacity of the bus is temporarily taken up fully by interperipheral or memory/peripheral transports. On the one hand, such transports may have a fast data throughout. On the other hand, the necessary control may be of limited extent, so that no processor station is always required to monitor this transport.

SUMMARY OF THE INVENTION

It is an object of the present invention to allow for realizing a bulk data transport on the secondary bus while providing a limited amount of monitoring of such bulk data transport while the combination formed by the pimary processor station and the first memory may continue to operate during such a bulk data transport, without a provision being necessary for coping with an "abort instruction" situation as caused by a request from the secondary bus to the primary bus, as allowable in the prior art system, and wherein, furthermore the bus transports are organized so that the processor can still gain access to the secondary bus on a character scale, while control signals from the processor station or from a first peripheral apparatus, which control signals do not belong to a data transport, can also quickly reach their destination, the above being realized with a minimum of control elements being required for the secondary bus.

These objects are achieved in a computer system of the above indicated type which is characterized in that said coupler has directional gating device for selectively and unidirectionlly gating command signals exclusively from said primary bus to said secondary bus, in that said second interfacing means comprises timing control means for controlling bus allocation signals (BUSRN, MSN, BSIN) and bus handshake signals (TMRN, TMPN) for the secondary bus, and in that said coupler is also transmissive for a start signal emanated from the primary processor station for a peripheral apparatus connected to the secondary bus and also for an interrupt signal from a peripheral connected to the secondary bus to said primary processor station.

For many categories the throughout limitation is virtually nonexistent, such as for a keyboard, an alphanumerical display apparatus, or an impact-type matrix printer. However, there are various peripheral apparatus which do claim a large part of the transport capacity of the bus, for example a display apparatus utilizinga high-resolution cathode ray tube for the display of all the information contained in a full page (full page display). Even more often peripheral apparatus for bulk data storge will be concerned. In a practical case the following mean possible transport capacities were found:

(a) bus 1100 kbytes/second;
(b) magnetic disc memory 100 kbytes/second;
(c) digitally optically scanned disc memory (DOR) 300 kbytes/second;
(d) double floppy magnetic disc 60 kbytes/second.

Viewed on a time scale of less than one second, the transport capacities of the input/output apparatus (d) and (d) are even higher, so that in many cases a data transport from/to such an apparatus can completely block the bus for a substantial period of time (for example from $10^{-4}$ to $10^{-3}$ seconds). For some applications it is feasible to provide a completely separate second bus for such a bulk data transport, but this increases the cost of wiring and also the complexity of the control system. The known system is often inadequate, because many stations share a common bus while on the time scale of such bulk-data transport the processor station often must exchange data with other peripherals and/or memory. The processor station, being constructed, for example, as a 16-bit microcomputer, will then also comprise a local read-only memory so that the data exchange therewith need not take place via the system bus; in that case the latter transport is performed inside the microcomputer (usually via an internal bus).

The above described set-up enables a bulk data transport to be performed on the secondary bus in a computer system of the described kind while the combination formed by the primary processor station, the first memory and a second peripheral apparatus can continue to operate during such a bulk data transport, usually by way of data transports on the primary bus, the bus transports being organized so that, each time, the primary processor station can still gain access to the secondary bus on a character scale, for example for a memory access to the second memory, while control signals from the primary processor station or from a first peripheral apparatus which control signals do not belong to a data transport can also quickly reach their destination. A right bus request is a request which concerns a data transport via the secondary bus, that is to say between a station on the primary bus and a station on the secondary bus. The information transported may contain data as well as an addres. Such a request for the secondary arriving from the primary bus can be applied to the controller of the secondary bus via the primary bush only if the primary bus has been allocated for the transport of the latter request. When several potential master stations are connected to the primary bus, an arbitration process may be required to select the ultimate master station. A start signal concerns, for example, an instruction to start an electromechanical operation, such as the starting or stopping of a drive or positioning a motor, or the control of a hold and release mechanism of a memory cassette or memory disc.

Interrupt signals may be generated by a station connected to the secondary bus. There are two categories of such interrupt signals. A first category forms a response (I/O-complete) to a start signal in order to indicate that, for example, a drive motor has reached its operating speed or that a cassette has been mechanically released. Subsequently, usually an intervention by the operator is required. In this case the period of time expiring between the start signal and the interrupt signal is very long in comparison with a bus transport cycle. The second category is formed by an alert signal which is automatically formed by a station connected to the secondary bus, for example in order to indicate that an amount of information is ready for transport. These are conventional categories of signals. A bulk transport can thus be quickly performed on the secondary bus without the processor station on the primary bus being seriously disturbed thereby. The peripheral apparatus acts, for example, as the background memory and the second read/write memory as the foreground memory.

Preferably, said coupler has a priority circuit for signalling a priority rank signal to said secondary bus, while said couler has a directional gating device for selectively and unidirectionally gating command signals exclusively from said primary bus to said secondarybus, in that said second interfacing circuit comprises timing control for controlling bus allocation signals (BUSRN), MSN, BSIN) and bus handshake signals (TMRN, TMPN) for the secondary bus, and in that said coupler is also transmissive for a start signal emanated from the primary processor station for a peripheral apparatus connected to the secondary bus and also for an interrupt signal from a peripheral connected to the secondary bus to said primary processor station.

In this awy the processor station, while present, can control the signalization on the secondary bus, while the coupler simply relinquishes such control in the closed state. It has become conventional to give the processor station the lowest priority rank. If such processor station is not present, the coupler function as a virtual processor station for the secondary bus.

Preferably, the secondary bus can simultaneously perform, in the closed state of the first coupler, two character-wise organized bulk data transports from the first peripheral apparatus to the second memory can from the second memory to a further first peripheral apparatus. The simultaneous organization of two bulk data transports via a non-divided bus (in this case the secondary bus) is known per se; an attractive implementation thereof is disclosed in the previous U.S. patent application Ser. No. 407,194, filed Aug. 11, 1982 assigned to the assignee of the present application which is incorporated herein by way of reference. The entire second read-write memory, or even a part thereof, then forms a buffer memory having a virtually unlimited storage capacity.

Via a plurality of couplers, a corresponding number of secondary buses can be connected to the primary bus in parallel. On the other hand, using an additonal gating device, a subordinate bus may be connected to a secondary bus. It is to be ensured that each memory location which can be addressed from a given primary or secondary bus than has a unique addres on the relevant bus.

Preferably, a second processor station is connected to at least one said secondary bus. As a result, the processing capacity of the entire system is increased. The second processor station may have the same construction as the first processor station, but alternatively it may comprise, for example, a processor for a special purpose having a lesser flexibility. A processor station is to be understood to mean herein a station which is constructed first of all for the processing of the data received via the associated bus and for the subsequent transport of the processing results to the bus. Peripheral apparatus are to be understood to mean herein apparatus which serve either for bulk data storage or for communication with the environment. In many cases such peripheral apparatus include a control unit which has processor means. The operation of these processor means, however, is not influenced by the user of the system in the same way as he influences a processor station.

Preferably, a second processor station is connected to the secondary bus which is connected to the primary bus by the first coupler, the first coupler comprising an address converter for converting a memory address received within a request for teh secondarybus. In that case, the accessible address spaces maybe arbitrarily positioned for both processors. The address space on the primary bus then extends, for example, from 0 to 2 M (byte numbers), the first 1 M addresses thereof being situated in the first read-write memory. For example, the first 256 addresses thereof are reserved for the software of the first processor station itself (for example, as index registers). The second 1M addresses are situated in the second read-write memory but are addressed on the secondary bus by the addresses 0–1M. The same first 256 addresses on the right secondary bus are reserved for the second processor station and the part of the software which controls the management of these 256 address locations may be the same for both processor stations.

DESCRIPTION OF THE PREFERRED EMBODIMENT

OVERALL BLOCK DIAGRAM

Figure 1A:
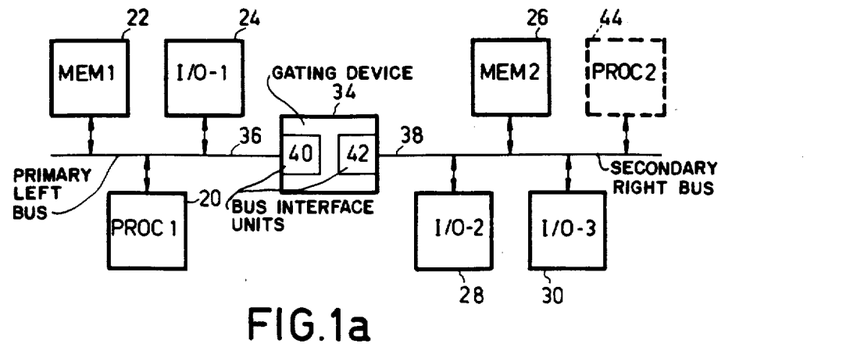
FIGS. 1a, 1b show two block diagrams of exemplary computer systems in accordance with the invention.

FIG. 1a shows an exemplary overall block diagram of a computer system in accordance with the invention. The central element is formed by a bus which is divided into a primary or "left" bus 36 and a secondary or "right" bus 38 which are interconnected by way of a gating device 34. The relevant conductors for data signals, address signals and control signals are not separately shown. A first processor station 20 is connected to the left bus 36. This station comprises, for example, an arithmetic and logic unit, registers, a read-only memory for the storage of control information, a scratchpad memory and an external interface unit, said elements being interconnected by means of a processor bus. This internal structure has been omitted for the sake of brevity. Processor stations of this kind are available as ready-to-use modules; the program information is partly present in the read-only memory and is partly applied as instructions from the environment, for example from a read-write memory. Also connected to the left bus is a first random access read/write memory MEM1 (22). In the present embodiment, the left bus comprises 16 data lines and 24 address lines. Also connected to the left bus 36 are a peripheral apparatus 24, for example a video monitor, a character printer, a keyboard, a background memory or a control unit for connection to a data communication link. Obviously, several of such peripheral apparatus may be connected to the left bus. A second read-write memory MEM2 (26) is connected to the right bus (38). Also connected to the right bus are a peripheral apparatus 28 and a further peripheral apparatus 30. Usually these peripheral apparatus will be background memories, for example in the form of a magnetic memory with a rotating magnetic disc of flexible (floppy) or unflexible properties, a magnetic tape memory or a memory comprising a rotating, optically scanned disc on which the information is stored in local recesses in the disc surface. They may also be other peripheral apparatus such as a line printer or a display apparatus comprising a high-resolution cathode ray tube. The peripheral apparatus can in principle be exchanged between the left and the right bus; peripheral apparatus having a high throughput will usually be connected to the right bus. In gien cases peripheral apparatus can be addressed as if they were mapped on an address location of the read-write memory connected to the associated bus. Furthermore, a second processor station 44 may be connected to the right bus. This may be a special processor station, for example a data base processor; its construction may also be the same as that of the first processor station 20. It is denoted by broken lines. Even when it has the same physical construction as the first processor station it may operate differently, for example by way of a different set of instructions or by way of a different operating system. It may also operate exclusively for data communication operations with respect to an external connection. The computer system also comprises a coupling or gating device 34 which is connected between the left bus and the right bus. The gating device 34 has an open state for data, addres, data request and data acknowledge signals and a closed state. Its operation will be elaborated upon hereinafter. Many peripheral apparatus also comprise their own control unit which is not shown in the figure and which may inter alia include a data buffer; viewed from the relevant bus, the actual physical function of the relevant peripheral apparatus is then absent, so that no problems are experienced as regards rotational delay times of memory discs, seek times of read/write heads, and the like.

Figure 1B:
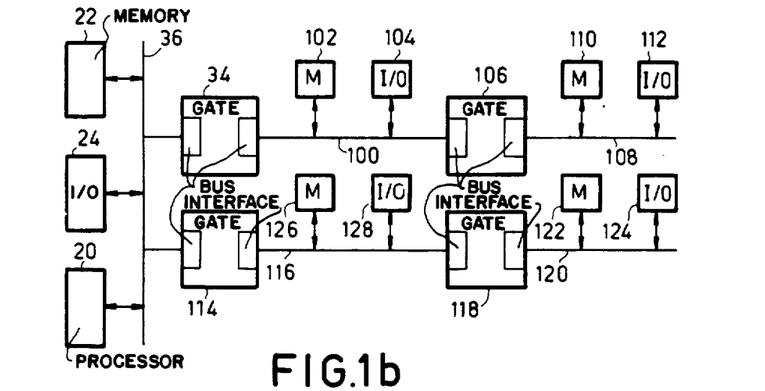

FIG. 1b shows a further exemplary block diagram of a computer system. The system comprises a left bus 36 whereto the staions 20, 22, 24 described with reference to FIG. 1a are connected. The computer system also comprises four gating devices 34, 106, 114, 118 for the connection of the right buses 100, 116 and the secondary right buses 108, 120, respectively. The random access read-write memories 102, 110, 126, 122 and the peripheral apparatuses 103, 112, 128, 124 can thus be connected. Each of the gating devices has an open state and a closed state. Data transports can thus be realized between different stations.

DEFINITION OF THE BUS

The bus consists of a number of parallel conductors for bindar signals. First of all there are 16 data lines. Also provided are 24 address lines by means of which a master station can address a slave station. During each data transfer there is one master station: the allocation of the master function may be dynamic. The selection of a slave station by the relevant master station may also be dynamic. A processor station always acts as the master station; a random access read/write memory always acts as a slave station. Many peripheral apparatus are capable of performing the master function as well as the slave function. The gating devices can also perform both functions as will be explained hereinafter. The definition of the master/slave station is embodied in the control signals are transported via control lines which are all singular (width 1 bit). The control lines are identified by the following mnemonics of the relevant signals.

CHA: makes a selection between an 8-bit character and a 16-bit word when a memory is adessed. In the former case only eight predetermined data lines are used each time; the difference between character and word, however, will be ignored in the following description.

WRITE: selects the transfer direction between master station and slave station.

TMPN (transfer/master peripheral) is a start synchronizatio pulse from a master station to the control unit of a peripheral apparatus acting as the slave station, or to a second processor station (for example, the element 44 in FIG. 1a).

TMRN (transfer master/register), same as TMPN, but to a random access read/write memory (acting as a slave station).

TMEN (transfer master/external) same as TMPN, but to a specific category of peripheral apparatus, so-called "dumb" peripheral apparatus, for example a punched tape reader or hexadecimal display elements comprising light-emitting diodes (acting as peripheral apparatus). Other external registers can also be used in this way; in that case TMEN replaces TMPN.

TSMN: response pulse to the synchronization pulses TMPN, TMRN and TMEN; this response pulse is despatched by a slave station in order to indicate:
  (a) the validation of a data character despatched by a slave station or, as the case may be:
  (b) acknowledgement of the reception of a data character or address word received by a slave station.

BUSRN: request signal for the bus which is formed on the basis of request signals from stations wishing to become the master station of the bus; when there are request signals from said stations the request signal BUSRN is formed as a logic OR-function of the relevant individual request signals.

MSN: signalling pulse which indicates that the selection of the master station has taken place.

BSYN: signalling pulse indicating that the bus is occupied.

OKI/OKO: these signals are not true bus signals but serve (each time separately per left bus/right bus) to indicate a priority sequence among prospecitve master stations. Each of the latter stations receives a signal OKI from the station of next-higher priority and outputs a signal OKO to the station of next-lower priority. In the present embodiment, this is achieved by means of wired connections which form a daisy chain. In random access read/write memories the connections for the signals OKI/OKO are pairwise interconnected because these stations can serve only as slave stations.

INCL (interrupt clock): synchronization signal produced by the first processor station for a further processor station or for the control unit of a peripheral apparatus in order to synchronize the processing of the interrupt signal BCI (see hereinafter).

BCI: (binary coded interrupt) signal having a width of one bit from the control unit of a peripheral apparatus to a processor station; an interrupt signal is specified therein by way of a serial code. This may signal, for example, an alert signal.

CLEARN: intialization signal from the central procesor station to all stations/memories/peripheral apparatus connected.

Some of the signal supplied by the power supply source have been omitted in the foregoing. The signals whose mnemonic ends with an N are active at the lower voltage level and the others are active at the higher voltag level.

OPERATION OF THE BUS

Some details of the bus operation will be described hereinafter. First the bus allocation to the next master station will be described. Subsequently, this master station can exhange data with another station. During the data exchange, the next bus allocation may already take place, so that the nwe master station will already be in a "waiting" state. For the allocation, the bus connection or interface units 40, 42 (FIG. 1a; the relevant bus connection units are not separately shown in FIG. 1b) of the gating device 34 also act as a station with respect to the left bus and the right bus, respectively. Control of the left bus is centralized in the first processor station. The control of the right bus 38 is centralized in the processor station 44 in FIG. 1a. In the absence of the latter station, control takes place in the bus connection unit 42. In the set-up shown in FIG. 1b (a single processor station), the control of the bus 100 thus resides in the gating device 34, the control of the secondary right bus 107 in the gating device 106, and so on. For a data transport it is detected whether a bus request on the left bus is actually intended for a station connected to the right bus; if this is so, the right bus (in FIG. 1a) must be allocated to the gating device 34 or the connection unit 42. It is only then that the intended data transfer may take place. In this elementary set-up a bus request emanating from the right bus for a station connected to the left bus is not permissable. The allowability of such a request would necessitate complex additional steps to prevent a possible deadlock situation between the bus interface units 40, 42 which might otherwise be wainting for one another. On the other hand, the set-up of FIG. 1a may include a mechanism to interchange the functions of the left bus and the right bus by means of an externally controlled additional facility, for example a manual switch. Evidently, the processor station 44 must then be present.

DESCRIPTION OF THE ALLOCATION

Figure 2:
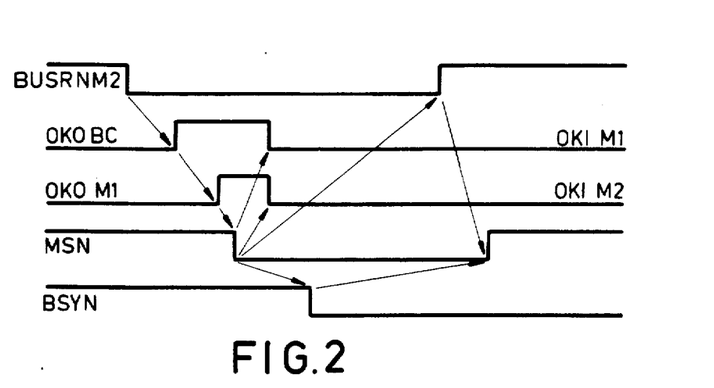
FIG. 2 shows a time diagram of the allocation.

FIG. 2 shows a time diagram of the allocation. There is a master station initially in all circumstances (after the appearance of the signal CLEARN). A station, for example a peripheral apparatus which thus far acted as a slave station, could now pretend to become the master station. A request function generated in the relevant station is treated on the bus by rendering the signal BUSRN low; the relevant line operates according to the open collector system and carries a high potential only if all stations connected to this line supply a high signal. This open collector system is followed for most control signals (however, not for the signals OKI/OKO). When there are no other requests, a request from the necessary station will be treated because it has the lowest priority. The processor station detects that the signal BUSRN is high and can occupy the bus by directly making the signal BSYN low, thus preventing further bus requests. However, if the signal BUSRN is low, the request from the processor station must yield to the request having a higher priority.

The fact that the signal BUSRN becomes low is detected by the bus control unit whose output signal OKO then becomes a high (second line in FIG. 2). This is passed on via the previously stated chain connection of the OKO/OKI signals, so that the second line of FIG. 2 also represents the signal OKI for the acting master station. Each potential master station which has not despatched a signal BUSRN immediately despatches the signal OKO to the potential master station of next-lower priority when it receives the signal OKI. The stations which can operate only as a slave station are not effective in this daisy chain. The third line of FIG. 2 illustrates the situation for the potential master station which has despatched the signal BUSRN. When this station receives the signal OKI, it does not output a signal OKO (not even to potential master stations of lower priority which have despatched the signal BUSRN) but activates the signal MSN (master selected). This indicates the termination of the arbitration phase. Subsequently, all signals OKO are deactivated. When this has occurred, the relevant new master station waits for the bus to become free. This is signalled in that the signal BSYN is high or becomes high after termination of a previous data transfer operation. Thus, the next allocation operation can be performed during a data transfer. The time difference between the negative-going edges of the signals MSN and BSYN may thus be much larger than shown in the figure. When the signal MSN has become low, the signals BUSRN are rendered inactive (high) by all stations in order to indicate that their bus requests have been inhibited or are in the waiting situation. Finally, when the data transfer phase commences (BSYN becomes low) and the signals BUSRN are high, the signal MSN may become high in order to inidcate that a new allocation phase may commence; the cycle of operations shown in FIG. 2 may then commence again.

DESCRIPTION OF THE DATA EXCHANGE

Figure 3:
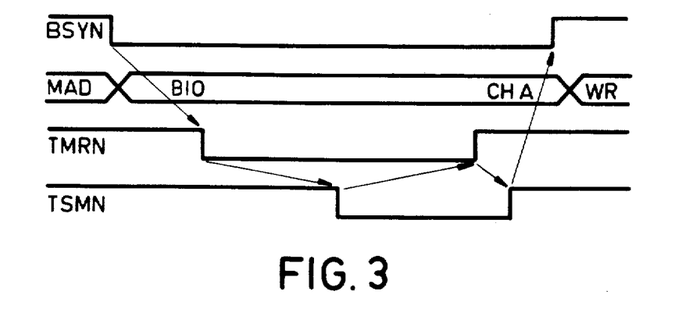
FIG. 3 shows a time diagram of a data exchange.

FIG. 3 shows a time diagram of a data exchange between a master station and a random access read/write memory. For another category of slave stations different signal (TMPN, TMEN) occurs instead of the signal TMRN. The actual data exchange commences only after the signal BSYN has been rendered low by the master station. The relevant master station subsequently applies its address information MAD and the control signals CHA, WRITE to the relevant bus lines and, in the case of a write operation, also the relevant data information (BIO). The crossing lines indicate that these signals may have an arbitrary value. After stabilization of these signals, the master station makes the signal TMRN low. After a memory access period, the slave station makes the signal TSMN low. For a write operation in the memory this means: data accepted; in the case of a read operation in the memory this means: data available for master station. The master station subsequently makes the signal TMRN high again. In the case of a read operation in the memory this means: data accepted. In the case of a write operation it constitutes a dummy response. The slave station subsequently makes the signal TSMN high again. At all times this is a dummy operation which merely serves to restore the initial situation. Subsequently, the signal BSYN is rendered high in order to release the bus and the signals MAD, BIO, CHA, WR(ITE) can be deactivated. Thus, one word/character can be transported in an arbitrary direction. As has already been described, right bus (buses) and left bus can thus operate separately.

DETAILED DESCRIPTION OF THE GATING DEVICE

The gating device (element 34 in FIG. 1a) is suitable for use in a more extensive computer system. The left half and the right half of FIG. 1a may both be constructed as a so-called "back panel", the relevant functional stations being accommodated on plug-type boards, for example of the so-called double EURO format. These back panels may be situated at a limited distance from one another, for example 5 meters. In its open state, the gating device acts as a slave station connected to the left bus with respect to the master station transmitting a request, and as a master station with respect to a slave station which is connected to the right bus and which receives the relevant request. Furthermore, the gating device always conducts the interrupt signals as previously described and start signals for peripheral apparatus. The latter signals are generated by the first processor station.

The gating device (in the embodiment shown in FIG. 1a) detects a gating request which is received form the allocated left bus when the most significant address bit has the value "1", so if MADEO=1, and the signal TMRN becomes low. In a preferred embodiment, the left bus comprises, for example, 1M address locations with addresses 000000 to 0FFFFF (hexadecimal notation), the right bus also comprising 1M address locations bearing the addresses 800000 to 8FFFFF. Another possibility for such a gating request is that TMPN becomes low without a given requirement being imposed as regards the address content. The gating device, or a processor station connected to the right bus, must subsequently provide the allocation on the right bus for the request from the left bus and after the allocation it must wait for the right bus to become free. After the release of the bus, the gating device or the processing station connected to the right bus renders the signal BSYN on this right bus low in order to keep it occupied. The transfer shown in FIG. 3 subsequently takes place. if gating requests can be generated by the left bus only, an operational system is obtained. In that case the gating device performs the following functions:

(a) detection that a request signal for the right bus appears on the left bus;
(b) allocation of the right bus;
(c) gating mechanism for interconnecting the right bus and the left bus over a given physical distance (<5m);
(d) LOCK operation which sustains an occupied state of the left bus which is activated by the signal BSYN for a longer period of time. A number of successive data transports are then performed by means of the handshake on a character scale by the signals TMRN, TSMN. The same is applicable when the slave station is connected to the right bus. A master station having a high throughput (notably a magnetic disc memory) can thus indeed achieve this high throughput in exchange operations occurring in rapid succession. Usually the number of directly successive exchanges is limited for each master station, for example to 2. However, if no other station issues a request for the bus, this lock mode may prevail for a prolonged period of time;
(e) when no processor station is connected to the right bus, the gating device acts as a right bus control unit for control of the allocation procedure.

Contrary to the foregoing, several address bits may be used for the selection of a gating device. When two address bits are used, three different gating devices can be addressed, each of which provides access to a relevant right but (100, 116 in FIG. 1b); the gating devices (34, 114) are then connected in parallel. Similarly, a right bus may comprise a further gating device in addition to the previously described gating device. The right bus acts as the master bus (left bus) with respect to the further gating device. A subordinate right bus (108, 120) is then connected to the other side of the further gating device (106, 118). Gating devices may thus also be connected in series. Again at the most three gating devices can be selected in such a configuration by means of two selection bits. Each gating device is then selected when the signal TMRN received becomes low, selection taking place on the basis of the decoding of one or more address bits.

The gating device is always also selected when the signal TMPN becomes a low, because the processor station need not know whether the addressed station is situated on the left bus or the right bus; in this case the station address is not "mapped" on an address location of the read/write memory (first or second). On the other hand, the signal TMRN may serve to address a station whose address is mapped.

For the allocation on the right bus the gating device has the highest priority of any connected station. This is also applicable when no processor station is connected to the right bus, so that the gating device must perform the request function as well as the allocation function and thus acts as the bus control unit. In the presence of a processor, the request function is performed by the gating device but not the function of bus control unit. When the right bus is released for the gating device and the signal BSYN becomes active (for the right bus), the left bus and the right bus can be unified by setting the relevant gates to the device is divided among two printed wiring boards with soldered-on electronic components, that is to say a "master" board, as described with reference to FIG. 5, for connection to the left bus, and a "slave" board for connection to the right bus, which is described with reference to FIG. 6. The reason for such a split is that the physical lengths of the left and the right buses taken separately must not become excessively large, because otherwise the original, high speed data transport cannot be maintained on the individual buses. Master board and slave board are interconnected by means of a bundle of lines whose length must not exceed a predetermined limit value, for example 5 meters. Thus, it is not necessary to maintain a typical data communication protocol on this bundle of lines. The slave board comprises a deactivatable bus controller which serves to process the start/alert signals of the right bus. When a (second) processor station is present, this part is deactivated.

DESCRIPTION OF SUBSYSTEMS BUSLSI

Figure 4:
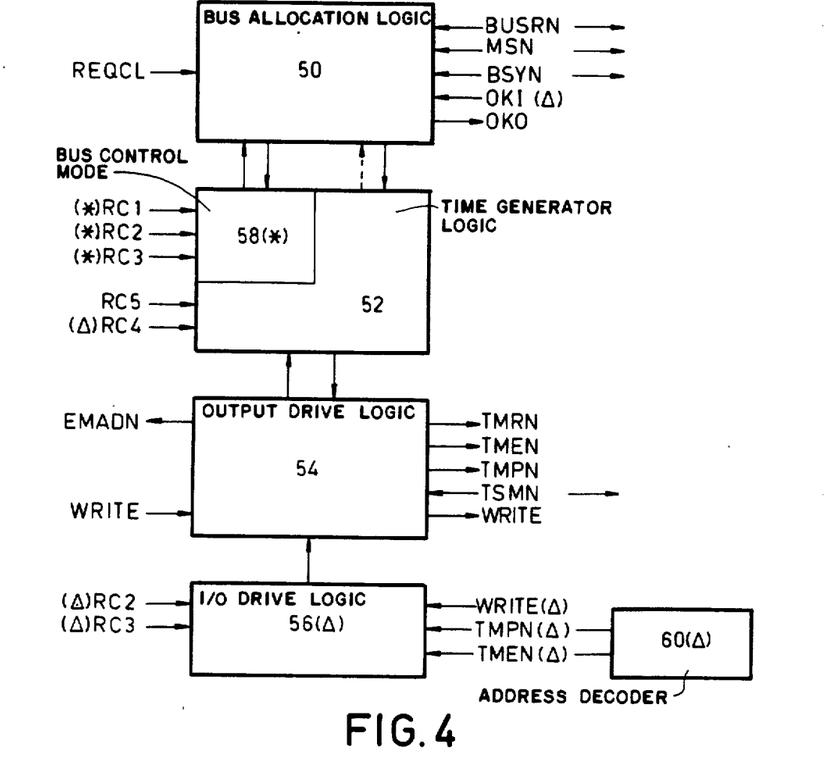
FIG. 4 is a block diagram of the subsystems of the circuit BUSLSI.

The gating device comprises two integrated circuits BUSLSI which are accommodated on the slave board to be described with reference to FIG. 6. The use of one such integrated circuit is known per se from the "4000" computer series of Philips Data Systems, Oude Apeldoornseweg, Beekbergen, the Netherlands, for the control of a single bus, so without the gating device between respective buses. The type number of this customade circuit is SPC 16-12. The processor station is then formed, for example, by a processor of the type P 4500. The relevant integrated circuit comprises some functional subsystems which will be described with reference to FIG. 4. The circuit performs the following functions:

(a) on the slave (right) side, the block 50 provides the allocation of the right bus to the connected station having the highest priority;

(b) the time generator logic is initialized by the bus allocation logic in order to generate synchronization signals for the control lines and to ensure the minimum/maximum values for the signals on the address and data lines of the bus (52, 58); to this end, five RC time constant elements which are indicated as RC1 ... RC5 are required; they are shown in FIG. 6;

(c) the output drive logic for the driving of a number of control lines and for forming the enable signals for the drive elements for the signals MAD (addresses), BION (data), CHA and for the receiving elements of the signals BIO (54). In the simplified set-up of FIG. 6, several of these connectios are not used;

(d) in the operating mode in which a second processor station is connected to the right bus, input/output drive logic (56) for controlling, using external logic such as an address decoder (60), the output drive logic (54) and the time generator logic (52) in order to produce response signals. This section is not elaborated in FIG. 6;

(e) in the operating mode as bus control unit, in which no second processor station is connected to the right bus, a control section for providing the allocation.

An asterisk (*) accompanying a signal or a block in FIG. 4 indicates that it is relevant only in the bus control mode in which no second processor station is connected to the right bus. A triangle indicates that this signal/block is relevant only if a processor station is connected to the right bus. When "nothing" is indicated, no difference exists between the two operating modes. As will be explained hereinafter, however, the elements RC2, RC3 are always present. In addition to the signals already described, the following further signals are specified. These signals concern the operating mode in which a second processor station is connected: (It is to be noted that the first circuit BUSLSI in the circuit of FIG. 6 is always in the same operating mode).

REQCL: (REQUEST CLOCK) a signal supplied by the master station; its positive-going edge is used for the starting or storage of a specified request.

EMADN: ENABLE MAD. This signal is active during the execution of a requested data exchange, for example as an enable signal for the drivers for the memory address lines and for the signal CHA; it also acts as an indication for a data exchange being executed.

CU: this continuous signal selects the relevant operating mode (without processr station).

RESET: this signal resets the elements of the circuit BUSLSI to a known initial state.

CONSTRUCTIO OF THE GATING DEVICE

Figure 5:
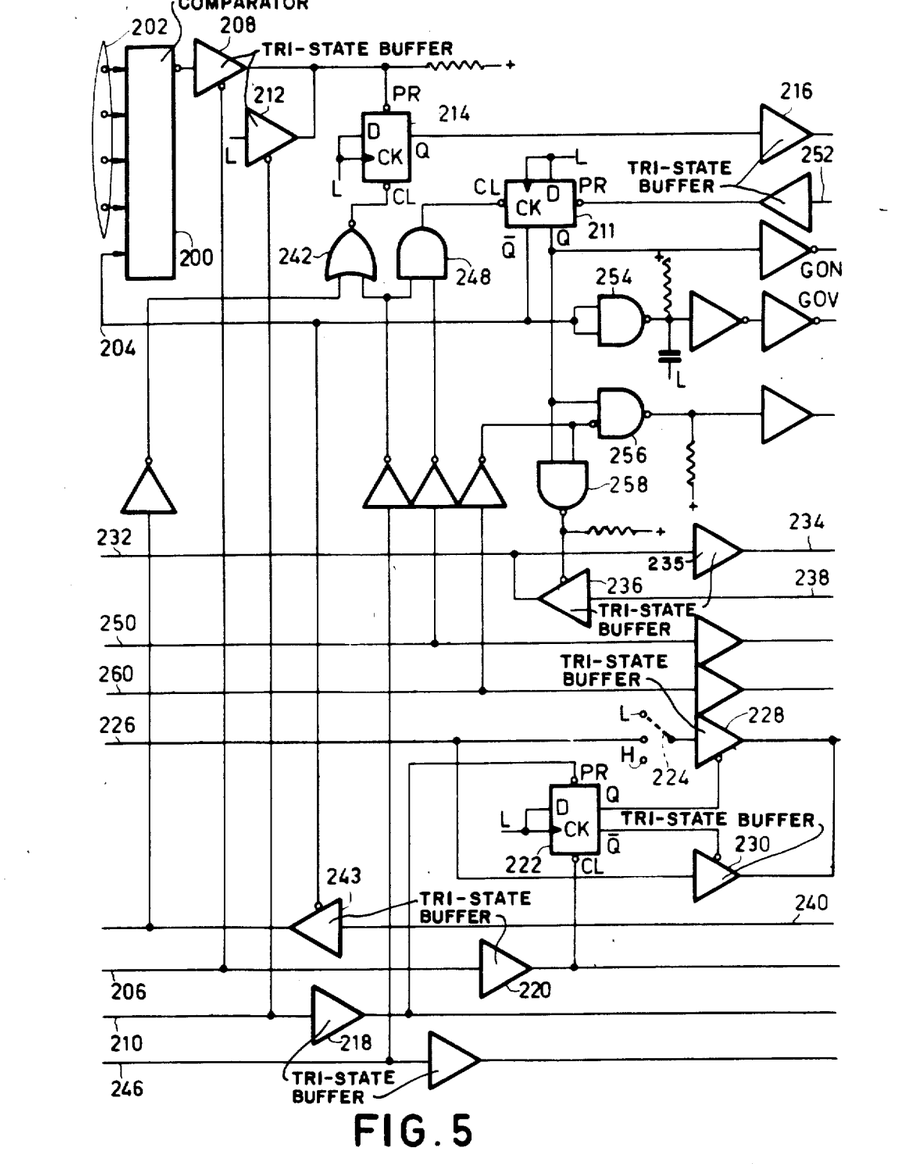
FIG. 5 is a detailed representation of the "master" section of the gating device.

FIG. 5 is a detailed representation of (the major part of) said master board. The address bits MADEO-MADE3 are used to enable at the most 15 gating devices to be selected. This four-bit code is applied to the inputs 202 and is compared in the four-bit comparator 200 with the device's own code permanently adjusted by means of switches (not shown). Moreover, a high signal must be present on line 204 and the comparator 200 actually operates across a data width of five bits. Input 206 receives the signal TRMN in order to activate the tri-state buffer 208. The gating device is also activated by the signal TMPN on input 210 by way of the tri-state buffer 212, (208 and 212 being combined in a wired OR-function). The selected state is tored in the data flip-flops 214, type Texas Instruments 74S74. In this respect "L" means: low voltage level; D: data; CK: clock; PR: present signal; C: clear signal; Q: output data; $\overline{Q}$: dito but inverted. Via a tri-state buffer 216 the data REQL is applied to the slave board. The effect of buffer stages on the mnenomics of the signals will be ignored for the sake of simplicity. In the case of series-connected gating devices, e.g. elements 34, 106 in FIG. 1b, comparison with seveal codes in parallel is possible, for example in that one or more address bits may have a "don't care" value. The signals TMPN and TMRN are applied to data flipflop 222 via further tri-state buffers (218, 220) which are not externally controlled. This data flipflop controls an address converter which is formed by a three-position switch 224. In the central position, an address bit received from terminal 226 is conducted without modification; in the lower position, this address bit is converted into a high signal; in the upper position, it is converted into a low signal. The state of the flipflop 222, controlled by TMPN and TMRN, selects one of the tri-state buffers 228, 230. The address conversion is in any case deactivated when element 230 is activated. The signals TMPN, TMRN are also supplied to the slave board. The address bits are applied not only to the elements 200, 228, 230, but furthermore in unmodified form, to the slave board via tri-state buffers. These have been omitted for the sake of simplicity. The data bits (indicated by a single bit input 232) are transferred to the slave board via a tri-state buffer (235). In the opposite direction, a controlled tri-state buffer 236 is active. The data connection between master board and slave board is double (see connections 234/238).

The deselection of the gating device is performed by the resetting of the flipflop 214 from a NOR-gate 242. The latter is driven first of all by the signal TSMN on input 240, subject to the condition that the tri-state buffer 243 conducts under the control of the state of flipflop 211. The signal TSMN is then also applied to the left bus. The deselection of the gating device further takes place by the reset signal CLEARN on input 246 (via an inverter which is not numbered). The latter signal is also applied to AND-gate 248 which also receives the signal BSYN from input 250. The output of the AND-gate 248 controls the reset input of flipflop 211. The set input is controlled by the signal EMADN on input 252. The inverted output of flipflop 211 is connected to the comparator 200 and, via a NAND-gate 254 and an RC-network (producing a delay of, for example, 200 ns), to the slave board as the signal GOV. The non-inverted output of the flipflop 211 is (signal GON) connected to the slave board and also to the NAND-gates 256, 258. The other inputs of these gates are controlled by the signal WRITE on input 260 (gate 256 via an additional inerter which is denoted by a circle). The signal from the gate 256 is applied to the slave board.

The following signals are not shown in FIG. 5; BCI, INCL, CHA which are all applied to the slave board via a buffer stage.

Figure 6:
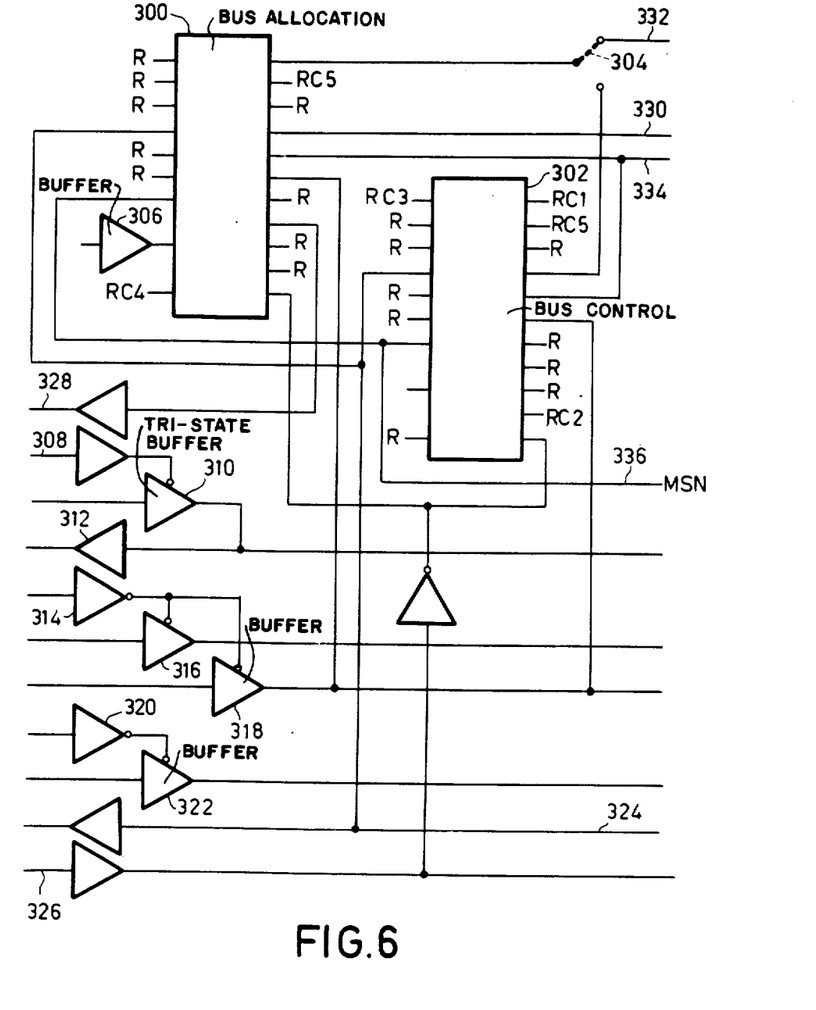
FIG. 6 is a detailed representation of the "slave" section of the gating device.

FIG. 6 is a detailed representation of (the major part of) said slave board. The circuit essentially consists of a first circuit of the described type BUSLSI (300) which performs the allocation, and a second circuit of this kind (302) which acts as the bus control unit. The switch 304 performs the selection between the operating modes of the gating device with and without a second processor station connected to the right bus, respectively. The left side of FIG. 6 is connected to the right side of FIG. 5. The right side of FIG. 6 is connected to the right bus. Buffer stage 306 is connected to element 216 in FIG. 5 in order to apply the signal REQCL to the circuit 300. The connections which are denoted by a reference including the letter "R" are connected to a high power supply potential via a current limiting resistor. The connections which are indicated by the reference "RC" are, moreover, connected to a low power supply potential via a capacitor, thus forming an RC network having a relevant RC time-constant. Some other connections shown are floating. The entire circuit BUSLSI is accommodated in a conventional, 28-pin casing in which pin 1 is situated at the top left in the figure, followed by the other pins in the appropriate sequence. Eight connections concern power suply, ground and some functions which are irrelevant in this context. In put 308 receives the signal from gate 256 in order to render the controlled tri-state buffer 310 selectively conductive for the data. element 310 is thus fed from connection 234, while element 312 is connected to line 238. Element 314 is driven by the signal GON of FIG. 5. The controlled buffer 316 symbolizes a number of such buffers for the relevant signals WRITE, CHA and the address bits. The controlled buffer 318 receives the signal BSYN (from line 250 in FIG. 5). The conducted signal is applied to the circuits 300, 302. Element 320 is fed with the signal GOV of FIG. 5; the controlled buffer 322 symbolizes two elements of this kind for the signals TMRN and TMPN, respectively. The line 324 is fed with the signal TSMN which is applied to both circuits 300, 302. Input 326 receives the reset (CLEAR) signal which is applied to the circuits 300, 302 via an inverter. The circuit 300 produces the signal EMADN on output 328. The circuit 302 applies the corresponding signal OKO to switch 304. In the lower position of the switch 304, the signal OKO from the circuit 302 is applied to the circuit 300 in order to act as the signal OKI. In the upper position of the switch 304 the signal OKI for the circuit 300 is derived from line 332 of the right bus. Furthermore, both circuits 300, 302 receive the signal BUSRN on line 334 (and also put the signal BUSRN from the gating device on this line). Finally, line 336 carries the signal MSN.

Under the control of one of the initiations (signal TMPN, TMRN), the right bus may be requested; this is performed by way of the signals REQCL, BUSRN, (RC1.OKI)/OKO, MSN. When the right bus is allocated to the gating device, the signals BSYN, TSMN, EMADN, CHA, WRITE, BIO, MAD are active, EMADN then coupling the right bus and the left bus to one another for the data transport. After termination of this coupling, the gating device is reset by the signal TSMN, so that a new request for the right bus can be treated. Consequently, selectively coupled are;

from the left bus to the right bus:
MAD, WRITE, CHA, BSYN, TMRN, TMPN and, in the case of a write operation:
BION;

from the left bus to the right bus:
TSMN, ACN and, in the case of a read operation: BION.

Permanently interconnected are:
CLEARN, INCL, BCI.

The switching through of the signals TMRN, TMPN is delayed slightly in the same manner as indicated in FIG. 3 (third line) for MAD, BION etc. The entire gating device is reset by the negative-going edge of the signal BSYN on the left bus.

What is claimed is:

1. A computer system having a primary processor station (20) and a first random access read-write memory (22) having a first address space interconnected by a primary bus (36) for data, address signals and control signals;

said primary processor station having intercommunicating means for communicating sequentially a request signal from a prospective master station (BUSRN), then a bus allocation signal (MSN), then a "bus occupied" signal from said primary processor station (BSYN) and thereafter data signals, addres signals, master handshake signals (TMRN, TMPN) and slave handshake signals (TSMN) between an actual master station and an actual station accessed by said master station;

coupler means (34) having first interface mans (40) for interfacing to said primary bus and functioning thereto as a slave station, and second interface means (42);

a second random access read-write memory (24) having a second address space outside of said first address space, and at least one first peripheral apparatus (28) interconnected by a secondary bus (38) for data, address and control signals, said second interface means functioning as a potential master station with respect to said secondary bus;

said coupler means having, by means of inteconnection of said first and second interface means, a transmitting state for exchange of data characters, addresses, data request signals, data acknowledge signals and control signals between said primary bus and said secondary bus for executing an information exchange between a master station on said primary bus and a slave station on said secondary bus; characterized in that:

said coupler means having static deadlock preventing means comprising unidirectionally transmitting means for transmitting initiating request signals exclusively from said primary bus to said secondary bus while blocking any transfer initiation requst signals generated by a station connected to said secondary bus;

said coupler means having alternatively to said transmitting state a non-transmitting state for allowing the coexistnece of a request on said primary bus and also data transfer between at least two stations on said secondary bus;

said second interface means for operating in a bus controller state for said secondary bus in absence of a further processor station on said secondary bus having allocation control means for exclusively controlling said secondary bus under control of a request signal (BUSRN) from said primary bus to the secondary bus; said allocation control means having first signalling means for generating on a first bus wire a secondary bus request signal (BUSRN), second signalling means for generating on a second bus wire a secondary bus "master selected" (MSN) signal, third signalling means on a third bus wire for generating a secondary "bus occupied" signal (BSYN), fourth signalling means for generating on a fourth bus wire secondary master handshake signals (TMRN, TMPN) under the control of master handshake signals from said primary bus after allocating said secondary bus to a request signal from said primary bus; and gating means under the control of a secondary bus slave handshake signal (TSMN) on a fifth bus wire for gating slave handshake signals (TSMN) from said secondary bus to said primary bus;

said second interface means having an alternative state to said bus controller state for operating upon presence of said further processor station on the secondary bus for relinquishing control of the "bus occupied" signal to said further processor while retaining control of said other bus allocation control and bus handshake signals; and said coupler means are also transmissive for a start signal emanated from the primary processor station for a peripheral apparatus connected to said secondary bus and also for an interrupt signal from a peripheral connected to said secondary bus to said primary processor station.

2. A computer system as clained in claim 1, characterized in that said second interface means have a priority means for signalling a priority rank signal (OKI, OKO) to said secondary bus, said priority means having a first position for signalling upon the absence of a secondary processor station on said secondary bus a lowest priority rank to said secondary bus, but upon presence of a secondary processor (44 on said secondary bus signalling a modified priority rang higher than the rank of said secondary processor.

3. A computer system as clained in claims 1 or 2, characterized in that there is provided a second secondary bus (116) which is connected to the primary bgus via a second coupler means (114) and whereto there are connected a third random accss read-write memory (110) and a third peripheral apparatus (128), all memory locations of said read-write memories having mutually different addresses with respect to the primary bus, the second secondary bus comprising means for performing, in the closed state of the second coupler means, a second character-wise organized bulk data transport between the third read-write memory and the third peripheral apparatus.

4. A computer system as claimed in claim 1 or 2, characterized in that there is provided a subordinated secondary bus (108) which is connected to the secondary bus via a third coupler means (106) and whereto there are connected a fourth random access read-write memory (110) and a fourth peripheral apparatus (112), all emory locations of said read-write memories having mutually different addresses with respect to the primary bus, all memory locations of the second read-write bus and the fourth read-write memory having mutually different addresses with respect to the secondary bus which is directly interfaced to the primary bus, the subordinated secondary bus comprising means for performing, in the closed state of the third coupler means, a third character-wise organized bulk data transport between the fourth read-write memory and the fourth peripheral apparatus.

5. A computer system as claimed in claim 1 or 2, characterized in that a further processor station is connected to at least one said secondary bus (14).

6. A computer system as claimed in claim 5, characterized in that a second processor station is connected to the secondary bus which is connected to the primary bus by the first coupler means, the first coupler means comprising an address converter (222, 224, 228, 230) for converting a memory address received within a bus request on the primary bus as destined for the secondary bus.

7. A computer system as claimed in claim 1, wherein said primary bus and said secondary bus are fabricated to realize a short-distance data communication protocol, characterized in that said first interface means and said second interface means are realized as respective printed circuit boards with associated electronic circuit modules, and in that said interface means are interconnected by a line bundle of substantially greater length than allowable for such short distance data communication protocol.

* * * * *